United States Patent [19]

Inooka

[11] Patent Number: 4,812,167

[45] Date of Patent: Mar. 14, 1989

[54] PROCESS FOR RECOVERING METALLIC GALLIUM FROM GALLIUM COMPOUND-CONTAINING WASTE

[75] Inventor: Masayoshi Inooka, Yokohama, Japan

[73] Assignee: Chiyoda Corporation, Japan

[21] Appl. No.: 182,954

[22] Filed: Apr. 18, 1988

[30] Foreign Application Priority Data

Apr. 24, 1987 [JP] Japan .................. 62-102746
Apr. 24, 1987 [JP] Japan .................. 62-102747

[51] Int. Cl.$^4$ .................................................. C22B 7/00
[52] U.S. Cl. ...................................... 75/63; 75/84
[58] Field of Search ................................ 75/63, 84

[56] References Cited

U.S. PATENT DOCUMENTS

| | | | |
|---|---|---|---|
| 3,020,128 | 2/1962 | Adcock et al. | 75/84.5 |
| 3,075,904 | 1/1963 | Hutter et al. | 75/84.4 |
| 3,166,405 | 1/1965 | Kulifay | 75/63 |
| 3,168,394 | 2/1965 | Johnson | 75/63 |
| 3,325,383 | 6/1967 | Iwantscheff et al. | 75/84.5 |
| 3,512,958 | 5/1970 | Yokozawa | 75/63 |
| 4,362,560 | 12/1982 | Abrjutin et al. | 75/63 |
| 4,767,455 | 8/1988 | Jourdan . | |

*Primary Examiner*—L. Dewayne Rutledge
*Assistant Examiner*—David Schumaker
*Attorney, Agent, or Firm*—Lorusso & Loud

[57] ABSTRACT

A sludge-like waste containing fine particulate gallium compound, an organic substance capable of forming coke upon calcination and a light oil or water are treated for the recovery of the gallium value as molten metallic gallium by a process wherein the waste is first dried to form a dense aggregate of the particulate gallium compound, followed by calcination and vacuum thermal decomposition. The aggregate may be molded under pressure into any desired shape before calcination.

15 Claims, No Drawings

PROCESS FOR RECOVERING METALLIC GALLIUM FROM GALLIUM COMPOUND-CONTAINING WASTE

BACKGROUND OF THE INVENTION

This invention relates to a process for the treatment of a gallium compound-containing waste for the recovery of the gallium value as metallic gallium.

Gallium is now increasingly consumed in a variety of fields especially in manufacture of semiconductors. Since gallium is not abundantly available in nature, the recovery of gallium from gallium-containing wastes becomes now more and more important.

In the manufacture of semiconductor wafers of gallium arsenide, gallium phosphide, or the like gallium compound, a large amount of powder or fine particles of such gallium compounds are produced during, for example, cutting single crystals to right cylinders and cutting of the cylinders into wafers. Since these cutting operations are desirably carried out with the use of a metal-working fluid such as a cutting oil or an organic compound-containing machining water, the gallium-containing waste produced by such operations is in the form of a sludge, generally called "dross". Such an oil or organic compound deposits on the surface of the gallium compound particles and cannot be removed by washing even with an organic solvent such as quinoline. Thus, it is very difficult to recover the gallium value from such sludge-like wastes.

A lot of methods for recovering gallium from gallium compound-containing wastes are known. Among others, a method involving vacuum thermal decomposition of gallium compounds is known to be effective in obtaining metallic gallium from gallium-containing wastes resulting from the manufacture of semiconductors (U.S. Pat. No. 4,362,560).

The vacuum thermal decomposition technique, however, cannot be applied for the treatment of the above-mentioned sludge-like wastes because the metal-working fluid foams violently during the vaccuum thermal decomposition. By distilling the sludge-like waste under vacuum with or without stirring, there is obtainable dried powder of the gallium compound. Such dried powder, however, cannot be effectively subjected to vacuum thermal decomposition since the fine powder or dust is easily scattered and flies off from the decomposition reactor. Moreover, the dried powder is not effectively thermally decomposable even the temperature is raised sufficiently.

SUMMARY OF THE INVENTION

It is, therefore, an object of the present invention to provide a method by which gallium can be effectively recovered from a sludge-like, gallium compound-containing wastes.

In accomplishing the above object, there is provided in accordance with the present invention a process for treating a waste containing a liquid, finely divided particles of a gallium compound and an organic substance capable of forming coke upon calcination for the recovery of the gallium value as metallic gallium, comprising the steps of:

(a) heating said waste at a temperature of below about 400° C. in the atmosphere of an inert gas to remove said liquid and to cause the finely divided particles to aggregate, thereby to form a dried mixture;

(b) calcining said mixture at a temperature so that coke is formed by thermal decomposition of the organic substance and the finely divided particles are bound with each other with said coke serving as a binder;

(c) subjecting the calcined product obtained in step (b) to vacuum thermal cracking to convert the gallium compound into molten metallic gallium; and (d) recovering said molten metallic gallium.

Other objects, features and advantages of the present invention will become apparent from the detailed description of the invention to follow.

DETAILED DESCRIPTION OF THE INVENTION

The waste to be treated in the method of the present invention is of a type which contains (1) a liquid, generally water and/or a light oil having a boiling point of up to 300° C., (2) one or more organic substances capable of forming coke upon calcination and (3) finely divided particles or powder of one or more gallium compounds. Wastes (generally called "dross" or "slime") resulting from cutting single crystals of gallium compounds with blades, bits or saws are typical examples of the material to be treated. The gallium compounds are those which are capable of being decomposed at an elevated temperature to form molten metallic gallium. Illustrative of suitable gallium compounds are gallium arsenide and gallium phosphide. Major proportion of the fine particles of the gallium compounds in the waste have a particle size of about 10 $\mu$m or less. The organic substances contained in the waste are, for example, straight lubricating oil, fatty oil, fatty acids, surfactants, etc. The content of the organic substance in the waste is 0.01-5% by weight based on the weight of the waste on dry basis. In the present invention, dried powder obtained from "dross" or "slime" may also be used. Such dried powder is, however, admixed with water or light oil such as kerosene prior to the commencement of the treatment of this invention.

The gallium compound-containing waste is first dried (step (a)) to cause the fine particles of the gallium compound to aggregate. It is important that the drying should not form non-aggregtted, fine powder of the gallium compound. Thus, the waste is heated, preferably quiescently and gradually, at a temperature of about 400° C. or less, preferably 50°-300° C. in an inert gas atmosphere, preferably in the atmosphere of steam or nitrogen, to remove the distillable components in the waste. During this heating step, the fine particles in the waste are densely bound with each other by the surface tension of the liquid being removed and form a dense mass of aggregated particles with 2-10 mm. This drying step is performed under ambient pressure, though a reduced pressure may be employed at an initial stage when the waste contains the liquid in a large amount.

When the waste is dried under vacuum (for example, a residual pressure of $10^{-1}$ mmHg or less), the resulting dried residues are in the form of a loose mass of fine powder rather than dense aggregates, even if the drying is carried out at room temperature. In the method according to the present invention, such dried powder must be mixed with water or a light oil and then dried again in the manner described above so as to obtain aggregates of gallium compound particles.

It is preferred that the aggregated particles of the gallium compound be molded into a shaped body. To achieve this purpose, the waste may be compression-molded as such or after adjusting the liquid content.

Conveniently, the waste is incompletely dried, then molded and, thereafter, completely dried. The shape of the molded body may be, for example, plate, sphere, pellet, cylinder or rod. The size of the molded body is preferably 2-100 mm in its longest axis.

The aggregated particles (or shaped body of the aggregated particles) thus obtained are then calcined (step (b)) at a temperature so that coke is formed by the thermal decomposition of the organic substance. The coke thus formed serves as a binder for improving the binding of the particles of the gallium compound. The calcination may be performed at a temperature of 300°-1000° C. The organic substance generally commences coking at about 300° C. and coking generally terminates at about 700°-800° C. At about 700°-1000° C., sintering of the particles of the gallium compound proceeds. The calcination may be performed in the atmosphere of an inert gas or under reduced pressure of $10^{-4}$-100 mmHg. When the content of the organic substance in the waste is small, the calcination is desirably performed in the inert gas atmosphere.

In order to further improve the binding of the particles of the gallium compound, an additive serving as a binder may be suitably added to the waste to be treated. Both organic and inorganic binders may be used. Examples of the inorganic binders include inorganic oxide hydrosols such as alumina hydrosols, alumina-silica hydrosols, silica hydrosols, magnesia hydrosols, titania hydrosols and precursors of these sols; clay minerals such as attapulgite, kaolin, montmorillonite and sepiolite; alkali silicate; alkali aluminate; aliminum salts; cements; lime; graphite; metallic gallium; phosphorus; arsenic; and hydrosols of gallium compounds. Examples of the organic binders include starch, straight lubricating oil, glycerin, polyvinyl alcohols, carboxymethylcellulose, alginic acid, tar and pitch. The amount of the binder (additive) may be 0.1-20% based on the weight of the waste (dry basis).

The admixture of the waste and the additive is dried in the manner as described above to cause the fine particles of the gallium compound to aggregate. As described above, the admixture is preferably compression-molded into a shaped body before the drying. The aggregate or its molded body is then calcined as described above, thereby to obtain a calcined product in which the gallium compound particles are tightly bound with each other with the additive serving as the binder. When the organic binder as described above is converted into coke during the calcination.

In a preferred embodiment, the waste is pretreated with 0.1-10N, preferably 0.5-5N hydrochloric or nitric acid for the removal of metal contaminates, such as indium, alkali metals, alkaline earth metals, aluminum, iron, nickel and chromium, from the waste. Thus, when the waste is an aqueous dispersion or sludge, hydrochloric acid or nitric acid is added direct to the waste to the above-mentioned concentration and the mixture is stirred at $-10°$ to 150° C., preferably 0°-100° C. for 0.5-50 hours. In the case of an oily waste, the oil is removed and the resulting dried mass is treated with the acid in the same manner as above. Through this treatment, the impurity metals or metal compounds are dissolved in the acid. The treated mixture is then separated into a solid-rich phase and a liquid phase by filtration, centrifuge, sedimentation or the like separation technique. The solid phase is then dried to obtain aggregates of the gallium particles as described above. If desired, an additive (binder) may be mixed with the solid phase.

The solid phase with or without the additive may be compression-molded before the drying. The dried product is then calcined in the same manner as above.

The calcined product is then subjected to vacuum thermal decomposition to convert the gallium compound into metallic gallium (step (c)). Generally, the thermal decomposition is performed at a temperature of 1000°-1300° C. under a pressure (except the partial pressure of sublimation products such as As and P and of gallium) of $10^{-5}$-100 mmHg. The higher the temperature and the lower the pressure, the higher the decomposition rate of the gallium compound becomes but the larger the loss of the metallic gallium becomes because of the vaporization. Therefore, the thermal decomposition is preferably performed at a temperature of 1050°-1150° C. under a pressure of $10^{-4}$-$10^{-1}$ mmHg.

As a result of the thermal decomposition, the gallium arsenide and gallium phosphide are converted into molten metallic gallium with the simultaneous formation of gaseous arsenic and phosphorus. The gaseous products are introduced into a cooling zone and recovered as solids by contact with cooled surfaces maintained at, for example 200° C. or less. The liquid metallic gallium may be separated from the solid residues by, for example, filtration with a filter having 50 mesh (Tyler) or finer. The purity of the metallic gallium thus recovered is generally 3N-5N (99.9-99.999%) in grade when In is regarded as being not impurity.

It has been found that the rate of the decomposition of the gallium compound is reduced as the decomposition proceeds. The reason for this is considered to be because the liquid metallic gallium produced can dissolve the gallium compound and because the diffusion rate of the gaseous decomposition product such as arsenic or phosphorus becomes slow as the proportion of the gallium compound dissolved in the liquid metallic gallium is small.

To expedite the thermal decomposition, it is effective to perform the decomposition by a method which includes providing in a vessel a first layer of molten metallic gallium, forming a second layer of the calcined particles of the gallium compound adjacent to and above the first layer, and heating the first and second layers to effect the thermal cracking while stirring the first layer. In this case, the molten metallic gallium produced by the thermal cracking is collected in the first layer. By stirring the lower layer of liquid metallic gallium, gaseous component such as arsenic or phosphorus dissolved in the liquid layer is easily diffused into the gas phase thereby to prevent the decomposition rate of the gallium compound from being reduced. It is preferred that the stirring be effected by bubbling an inert gas such as nitrogen or hydrogen gas through the liquid layer for purging the dissolved gaseous components. It is not necessary that the layer of molten metallic gallium be present at the start of the thermal decomposition. When a layer of the calcined particles of gallium compound contained in a vessel is heated to effect the thermal decomposition, a layer of molten metallic gallium is gradually formed as the decomposition proceeds. This layer of the molten metallic gallium formed in situ may be used as the above-mentioned second layer. The stirring may be thus commenced after such a liquid layer is formed beneath the solid layer.

When the thermal decomposition of the gallium compound is continued for a long period of time, solids tend to deposit and accumulate on the walls of the decomposition reactor, pipes for the passage of gaseous decomposition products, or other apparatuses. The solids, which are found to be gallium arsenide or gallium phosphide produced by the reaction of the gaseous arsenic or phosphorus with gaseous metallic gallium, may be removed from the wall surfaces by heating them to above their decomposition temperatures while maintaining the pressure of arsenic or phosphorus within the system below about 100 mmHg, preferably below about 5 mmHg.

The molten metallic gallium recovered in the above process generally contains 1-1000 ppm of impurities such as Si, Al, Ca, Mg, Fe, Ni, Mn, Mo, As, P, Cl, Zn, Cu, In and Hg. These impurities may be removed by a method which includes the steps of introducing the recovered metallic gallium into a vessel to form a layer of molten metallic gallium, heating the layer to 1000°-1500° C. in an inert atmosphere or under vacuum until a surface layer containing impurities contained in the recovered metallic gallium is formed on the surface of the layer of molen metallic gallium, and removing the surface layer. During the course of the heating of the layer of molten metallic gallium, In, Zn, Hg, As, P and Cl components are vaporized and removed out of the vessel. Non-volatile components remaining in the layer are accumulated in the surface layer. Through this refining method, the grade of the metallic gallium may be improved from 3N-4N to 4N-5N.

The following examples will further illustrate the present invention.

EXAMPLE 1

A sludge-like waste ("dross", 300 g) containing fine particles of gallium arsenide and about 18% by weight of a light hydrocarbon oil having boiling points of 50°-200° C. charged in a quartz reaction tube having an inside diameter of 30 mm was heated to 150° C. under an ambient pressure in a nitrogen stream flowing at a rate of 100 cc/min and maintained at that temperature for 2 hours for the removal of the light hydrocarbon oil. The reaction tube was connected to a trap (oil vapor condenser tube) cooled by ice. The trap was connected to a three-way valve for selective communication with a vacuum device or with the air. During the above drying step, the passage extending between the outlet of the reactor and the inlet of the trap was maintained at 100°-150° C. Thus, the oil vapors and nitrogen gas were passed to the trap for condensing the oil and the nitrogen gas was discharged into the air through the three-way valve. As a result of the above drying procedure, there were obtained dense aggregates of gallium compound particles.

The dried mass was then heated to about 850° C. under nitrogen stream and maintained at that temperature for 2 hours to effect coking and sintering. During the course of this heat treatment, there was observed deposition of the decomposition gas in the upper portion of the reaction tube and in the entrance portion of the trap. The deposit (in the form of liquid) in the outlet portion of the reaction tube soon turned black. The analysis of the sintered product revealed 2.6% carbon, 46% gallium, 45% arsenic, and about 5% impurities such as In, P, Si, Fe, Al, Na, Ca, Mg, Cu and Cl.

The sintered (calcined) product was then subjectd to thermal decomposition. Thus, the nitrogen feed pipe was closed and the three-way valve was switched so that the reaction tube was connected to the vaccum device. The reaction tube was evacuated and heated to 1100° C. The passage between the reaction tube and the trap was maintained at 450°-500° C. to prevent the deposition of arsenic. The trap was cooled with liquid nitrogen. The residual pressure in the outlet side of the trap was soon reduced to 0.1 mmHg or less. At about 1000° C. (the pressure in the outlet side of the trap was about 0.01-0.001 mmHg), black arsenic appeared in the inlet portion of the trap. At about 1050° C., the formation of arsenic became remarkable. The thermal decomposition was continued at 1100° C. for 3 hours.

Then, the reaction tube was cooled and the contents in the tube were filtered twice with 200 mesh nylon filter clothes to obtain 92.8 g of molten metallic gallium. The recovery rate was 81%. The emmission spectroscopic analysis of the gallium revealed 1-10 ppm of Fe, Ca and Mg. Atomic absorption analysis and colorimetric analysis revealed 2.8% In and 0.6 ppm As, respectively.

For the purpose of comparison, the sludge-like waste was dried in vacuo to obtain a loose mass of fine powder of gallium arsenide. The dried powder was sintered and then subjected to vacuum thermal decomposition in the same manner as above. The particle size of the fine powder was increased very slightly by the sintering. However, the fine powder was scattered into the trap and into the vacuum pump and, therefore, the thermal decomposition was not able to be performed smoothly. Moreover, thermal decomposition of gallium arsenide failed to proceed satisfactorily even when the temperature was increased to about 1300° C.

EXAMPLE 2

A dried waste (300 g), which was obtained from a gallium arsenide scrup produced by wafer forming operations and at least 90% by weight of which was fine powder with a particle size of 20 mesh or finer, was charged in th same type of a reaction tube as used in Example 1, to which 100 g of deionized water was added. The waste was vibrated with a vibrator to substitute the water for the air in the interstices of the particles and to sufficiently impregnate the particles with the water. The resulting sludge-like mixture was then dried at 90° C. for 3 hours in the same manner as that in Example 1, followed by calcination at 600° C. for 2 hours. The calcined product was found to contain 0.4% carbon, 46% Ga, 51% As, and 0.8% impurities such as Si, In, Fe and Al. The calcined product was then sintered at 900° C. and at below 0.1 mmHg for 2 hours. During the course of the sintering treatment, there was observed deposition of a decomposition gas in the upper portion of the reaction tube similar to Example 1.

The resulting sintered product was then heated to 1150° C. and maintained at that temperature for 5 hours under vacuum. The passage between the reaction tube and the trap was maintained at 450°-500° C. during this vacuum thermal decomposition step. After completion of the decomposition, the contents in the reaction tube were filtered with Teflon filter cloth of 100 mesh and twice with nylon filter cloth of 0.8μ (manufactured by Millipore Inc.) to recover 107.0 g (recovery rate 77%) of molten metallic gallium. The analyses of the gallium were performed in the same manner as that in Example 1 and revealed 0.1 ppm As and 1-10 ppm Fe, Ca and In.

EXAMPLE 3

Example 1 was repeated in the same manner as described except that a gallium phosphide-containing waste with a water content of 23% was used in place of the gallium arsenidecontaining waste. The metallic gallium recovered was found to contain 1-10 ppm of Cu and Fe. The recovery rate for the phosphorus collected in the trap was 98.8%.

EXAMPLE 4

A sludge-like, oily scrup containing fine particles of gallium arsenide and about 18% by weight of an oil (mainly light hydrocarbon oil) was distilled in the atmosphere of nitrogen and then heated at about 500° C. for 1 hour to obtain a dense aggregate having the following composition: 3.1% carbon, 44% gallium, 46% arsenic, 5% impurities such as In, P, Si and Fe.

The aggregate was then admixed with 5% by weight of a solvent extract coal (pitch obtained by solvent extraction of coal under hydrogen pressure and having a carbon content of 89.4%, an ash content of 2.7% and a toluene insoluble content of 40.4%) as a binder, and the admixture (500 g) was placed in a quartz reaction tube. The packed admixture was then heated at 150° C. for 3 hours under a nitrogen flow, followed by calcination at 500° C. for 1 hour. Through the heat treatment, the binder was decomposed to form coke with which the gallium arsenide particles were tightly bound with each other.

The resulting calcined product was then subjected to vacuum thermal decomposition. Thus, the reaction tube was connected to a vacuum evacuation device with an arsenic trap being disposed therebetween. The passage between the reaction tube and the trap was maintained at about 500° C. The reaction tube was heated under vaccum to 1100° C. at a rate of 300° C./Hr and maintained at that temperature for 3 hours to effect vacuum thermal decomposition of gallium arsenide. The residual pressure in the outlet side of the trap during the thermal decomposition at 1100° C. was $10^{-2}$–$10^{-4}$ mmHg. The residues of the thermal decomposition thus obtained were filtered with 100 mesh filter cloth to obtain 150.1 g of molten metallic gallium containing 1-10 ppm of Si, Fe, Cu and Ca, 1.7 ppm of As and 3.1 of In.

EXAMPLE 5

The same kind of oily scrup (500 g) as used in Example 4 was dried at about 90° C. under a nitrogen gas flow until an oil content of 8% was reached. With the dried scrup were admixed 75 g of corn starch and 120 g of water. The admixture was kneaded and compression-molded in a mold into columns each having a diameter of 10 mm and a length of about 10 mm. The shaped products were then dried at 120° C. for 5 hours so that the fine particles were aggregated. Thereafter, the shaped products were calcined for 2 hours at 500° C. and for another 2 hours at 700° C. The calcined product which was found to have a carbon content of 5.2% was subjected to vacuum thermal decomposition at 1120° C. for 5 hours in the same manner as that in Example 4 to obtain 163.3 g of molten metallic gallium containing as impurities 3.4% In, 0.7 ppm As, 1-10 ppm Fe, Mg and Ca.

EXAMPLE 6

An aqueous sludge-like scrup containing fine particles of gallium arsenide and about 14% by weight of water was treated for the recovery of the gallium arsenide as metallic gallium. The elementary analysis of this scrup when dried at 500° C. for 1 hour showed 0.3% carbon, 43% gallium, 50% arsenic, and 0.1% impurities such as In and Fe.

Sepiolite lumps were ground by means of a ball mill and the ground particles were sieved to obtain fine sepiolite particles with a particle size of 100 mesh or finer. The sepiolite particles (100 parts by weihgt) were mixed with 200 parts by weight of water and the mixture was kneaded.

The sludge-like scrup (200 parts by weight) was mixed with the kneaded sepiolite (100 parts by weight) and water (50 parts by weight) and the mixture was sufficiently commingled. Then the mixture was extrusion molded into a columnar shape with a diameter of about 2 mm. The columnar extrudates were then dried (aggregation step) and calcined (coking step) in the same manner as that in Examle 5 to obtain a calcined product having a gallium content of 39%. The calcined product (500 g) was then subjected to vacuum thermal decomposition in the same manner as that in Example 5. The filtration of the decomposition residues gave 148.3 g of molten metallic gallium containing as impurities 0.3 ppm As, 1-10 ppm In, Fe, Cu and Ca.

EXAMPLE 7

The sludge-like scrup (100 g) shown in Example 6 was mixed with 20 g of water and 2 g of white carbon (fine particulate silica with a particle size of 1-20 μm). The mixture was placed in a quartz crucible and dried under nitrogen stream in the same manner as that in Example 4 to obtain a dense aggregate which was subsequently calcined at 500° C. for 1 hour. The calcined product was then subjected to vacuum thermal decomposition at 1150° C. for 1 hour in the same manner as that in Example 4. The decomposition residues obtained were filtered to recover 28.0 g of molten metallic gallium. The recovered gallium was found to contain as impurities 10 ppm As, 78 ppm In and 1-10 ppm Fe, Ca and Mg.

EXAMPLE 8

A fine particulate gallium arsenide-containing scrup was treated for the recovery of metallic gallium. More than 90% of the fine particles could pass through a 20 mesh sieve. The scrup was first dried at 90° C. for 3 hours to cause the fine particles to aggregate. The elementary analysis of the dried product revealed 0.4% carbon, 46% gallium, 53% arsenic and 0.8% impurities such as Si, In, Fe and Al. To the dried product (100 parts by weight) were added 20 parts by weight of metallic gallium (4N grade) and the mixture was sufficiently admixed by means of a mixer. The resulting admixture was compression-molded in the same manner as that in Example 5 into a columnar shape having a diameter of 10 mm and a length of 10 mm. The molded product was then calcined at 500° C. for about 2 hours under nitrogen stream. The calcined product (100 g) was placed in a quartz crucible and subjected to vacuum thermal decomposition at 1080° C. for 3 hours. The decomposition residues were filtered with a 100 mesh filter cloth to obtain 48.1 g of metallic gallium. Calculation revealed that 31.4 g of metalic gallium were recovered from the gallium arsenide scrup. The recovered gallium was found to contain as impurities 3.1 ppm As, and 1-10 ppm In, Fe, Ca and Cu.

EXAMPLE 9

A sludge-like, fine particulate GaAs-containing scrup (dross) produced during formation of wafers by cutting GaAs single crystals was treated to recover metallic gallium. The dross was first washed with acetone and dried at 100° C. to obtain a first, dried product. The first, dried product was found to contain the following impurities (the unit is weight ppm):
Al(75), Ca(32), K(9.5), Mg(11), Na(8), Ni(1.8), Cr(1.8), Cu(4.5), Fe(379), In(6300), Si(127), The dried product was mixed with 0.5N HCl and the mixture was stirred at 20° C. for 2 hours. The mixture was then filtered and the solid phase was washed with acetone and dried to obtain a second, dried product. The contents of the impurities in the second, dried product were as follows:
Al, Ca, K, Mg, Na and Ni (below 0.5) Cr(0.8), Cu(4.1), Fe(144), In(6200), Si(120) The filtrate was analyzed for the quantities of gallium and indium to reveal that 0.2% of the gallium in the first, dried product was dissolved into the filtrate by this hydrochloric acid extraction and that the extraction rate of the indium was 0.012%.

The above extraction treatment was repeated in the same manner as described except that the concentration of HCl was varied to 2N and 4N. The results are shown in the table below.

| Acid | Concentration | Ga Extraction rate (%) | In Extraction rate (%) | In Extraction Selectivity* |
|------|---------------|------------------------|------------------------|----------------------------|
| HCl  | 2 N           | 0.3                    | 2.3                    | 7.7                        |
| HCl  | 4 N           | 0.5                    | 69                     | 138                        |

*Selectivity = In Extraction rate/Ga Extraction rate

Similar treatment was conducted using 2N $HNO_3$ aqueous solution in place of HCl to reveal that the Ga extraction rate and In extration selectivity were 24% and 0.42, respectively. The contents in the purified product of the impurity metals other than In were almost the same as those with 0.5N HCl when the concentration of HCl was changed to 2N and 4N and 2N $HNO_3$ was substituted for 2N HCl.

The second, dried product obtained in the treatment with 4N HCl was mixed with water and the mixture was mixed with 3% by weight of starch and 20% by weight of water. The mixture was then dried at 120° C. for 5 hours, calcined at 800° C. and subjected to vacuum thermal decomposition at 1150° C. The decomposition products were separated by filtration into molten metallic gallium and a solid residue. The solid residue was found to contain following impurity metals:
Cu(2), Fe(1600), In(1100), Si(1100)
After pulverizing the solid residue to 20 mesh or finer, an extraction treatment was conducted with 4N HCl. The analysis of the extract revealed that the extraction rates of Ga and In were 2.1% and 81%, respectively. The extraction residue contained impurity metals as follows:
Cu(1.4), Fe(190)

EXAMPLE 10

Example 1 was repeated in the same manner as described except that the vacuum thermal decomposition was conducted while stirring the molten metallic gallium accumulated in the bottom of the reaction tube. The stirring was effected by passing nitrogen gas through the molten metallic gallium. Thus, 1 hour after the temperature of the reaction tube became 1100° C., nitrogen gas was supplied from the bottom of the reaction tube to maintain the partial pressure of nitrogen in the reaction tube at 5–20 mmHg. The thermal decomposition was continued for 2 hours under this condition. Then, the reaction tube was cooled and the contents in the tube was filtered twice with 200 mesh nylon filter clothes to obtain 109.0 g of molten metallic gallium. The emmission spectroscopic analysis of the gallium revealed 1–10 ppm of Fe. Atomic absorption analysis and colorimetric analysis revealed 2.4% In and 0.4 ppm As, respectively.

EXAMPLE 11

A crude metallic gallium obtained by vacuum thermal decomposition of a sludge-like, particulate gallium arsenide-containing scrup containing the following impurity metals was treated for refining (unit: weight ppm):
As(30), Si(45), Al(4), Mg(8), Ca(6), Fe(11), Na(23) The crude gallium (50 g) was charged into an open-topped transparent quartz crucible having an inside diameter of 19 mm and a height of 50 mm and the crucible was placed in a transparent quartz heating tube having an inside diameter of 28 mm. The tube was then evacuated at room temperature to $10^{-2}$–$10^{-3}$ mmHg and closed. The heating tube within which the gallium-containing crucible was placed was heated to 1150° C. for 5 hours. The tube was cooled and the crucible was taken out. White powder was observed on the surface of the molten gallium. This white powder was collected by means of a small-sized spatula and analyzed for its composition. A portion of the refined gallium in the crucible was sampled from the middle portion with a pippet and analyzed for impurities. The results are summarized in the table below.

| Metal | Amount (ppm) in white powder | Amount (ppm) in refined gallium |
|-------|------------------------------|----------------------------------|
| As    | 31                           | 0.3                              |
| Si    | 11,200                       | below 1                          |
| Al    | 110                          | below 1                          |
| Mg    | 370                          | below 1                          |
| Ca    | 240                          | below 1                          |
| Fe    | 1,270                        | below 1                          |
| Na    | 390                          | below 1                          |

The white powder separated from the gallium was also analyzed by a scanning lectron microscope to reveal that the powder are formed from needle-like particles and cluster particles. The refined gallium was treated again in the same manner as described above at 1000°–1400° C. White powder was no longer formed.

EXAMPLE 12

The same crude gallium (50 g) as used in Example 11 was placed in a quartz tube and heated at 1210° C. for 3 hours while continuously feeding pure nitrogen gas from the bottom. Formation of white powder on the surface of the liquid gallium was observed. The white powder was removed with a spatula and the remaining refined gallium was analyzed for impurity contents. Only As and Na (each below 10 ppm) were detected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for treating a waste containing a liquid, finely divided particles of a gallium compound and an organic substance capable of forming coke upon calcination for the recovery of the gallium valves as metallic gallium, comprising the steps of:
   (a) heating said waste at a temperature of below about 400° C. in the atmosphere of an inert gas to remove said liquid and to cause the finely divided particles to aggregate, thereby to form a dried mixture;
   (b) calcining said mixture at a temperature so that coke is formed by thermal decomposition of the organic substance and the finely divided particles are bound with each other with said coke serving as a binder;
   (c) subjecting the calcined product obtained in step 5 (b) to vacuum thermal cracking to convert the gallium compound into molten metallic gallium; and
   (d) recovering said molten metallic gallium.

2. A process as claimed in claim 1, wherein said waste is molded under pressure into a shaped body before step (a), the shaped body being subjected to step (a);

3. A process as claimed in claim 1, further comprising treating said waste with 0.1–10N hydrochloric acid or 0.1–10N nitric acid before step (a), and separating the resulting treated mixture into a solid-rich phase and a liquid phase, said solid-rich phase being subjected to step (a).

4. A process as claimed in claim 1, further comprising admixing said waste with an additive capable of binding the finely divided particles with each other upon being subjected to step (b), the resulting admixture being subjected to step (a).

5. A process as claimed in claim 4, wherein said additive is a organic material capable of forming coke during step (b).

6. A process as claimed in claim 4, wherein said additive is at least one member selected from the group consisting of inorganic oxide hydrosols, clay minerals, alkali silicate, alkali aluminate, aluminum salts, cements, lime, starch, metallic gallium, straight lubricating oil, glycerin, polyvinyl alcohols, carboxymethylcellulose, alginic acid, tar, pitch and graphite.

7. A process as claimed in claim 4, wherein the admixture is molded under pressure into a shaped body before step (a), said shaped body being subjected to step (a).

8. A process as claimed in claim 3, further comprising admixing said solid-rich phase with an additive capable of binding the finely divided particles with each other upon being subjected to step (b), the resulting admixture being subjected to step (a).

9. A process as claimed in claim 8, wherein the admixture is molded under pressure into a shaped body before step (a), said shaped body being subjected to step (a).

10. A process as claimed in claim 1, wherein step (b) is performed at a temperature of 300°–1000° C.

11. A process as claimed in claim 1, wherein step (b) is performed in an inert gas atmosphere.

12. A process as claimed in claim 1, wherein step (c) is performed at a temperature of 1000°–1300° C. and a residual gas pressure of $10^{-5}$–100 mmHg.

13. A process as claimed in claim 1, wherein step (c) includes providing in a vessel a first layer of molten metallic gallium, forming a second layer of said calcined product adjacent to and above said first layer, and heating said first and second layers to effect the thermal cracking while stirring said first layer, the molten metallic gallium produced by the thermal cracking being collected in said first layer.

14. A process as claimed in claim 13, wherein said stirring is by bubbling an inert gas through said first layer.

15. A process as claimed in claim 1, further comprising the steps of introducing the recovered metallic gallium into a vessel to form a layer of molten metallic gallium, heating said layer to 1000°–1500° C. in an inert atmosphere or under vacuum until a surface layer containing impurities contained in the recovered metallic gallium is formed on the surface of said layer of molen metallic gallium, and removing said surface layer.

* * * * *

UNITED STATES PATENT AND TRADEMARK OFFICE
CERTIFICATE OF CORRECTION

PATENT NO. : 4,812,167
DATED : March 14, 1989
INVENTOR(S) : INOOKA et al

It is certified that error appears in the above-identified patent and that said Letters Patent is hereby corrected as shown below:

IN THE SPECIFICATION:

Column 2, line 43, "non-aggregtted" should read --non-aggregated--.

Column 7, line 39, after "3.1" insert --%--.

IN THE CLAIMS:

Column 11, line 5, "valves" should read --values--.

Signed and Sealed this

Nineteenth Day of December, 1989

Attest:

JEFFREY M. SAMUELS

Attesting Officer    Acting Commissioner of Patents and Trademarks